United States Patent Office 3,567,372
Patented Mar. 2, 1971

3,567,372
SYNTHETIC CRYSTALLINE ZEOLITE
Heyman Clarke Duecker, Rockville, Md., and Armin Weiss and Carlos R. Guerra, Munich, Germany, assignors to W. R. Grace & Co., New York, N.Y.
No Drawing. Filed July 15, 1968, Ser. No. 744,634
Int. Cl. C01b 33/28
U.S. Cl. 23—111
2 Claims

ABSTRACT OF THE DISCLOSURE

A synthetic zeolite having a pore diameter of 17 angstroms having a diamond type cubic crystal with lattice spacing $d_{111} = 21.1 \pm 0.2$ angstroms and a unit cell of $a_0 = 36.7 \pm 0.3$ angstroms, prepared from aluminate and silicate solutions in the presence of varying amounts of sodium hydroxide.

---

This invention relates to a new microselective zeolite that is characterized by a pore diameter of 17 angstroms. We have designated the product zeolite Z–21.

The microselective adsorbents, known as molecular sieves are zeolites, that is, crystalline aluminosilicates with a three dimensional structure of silica-alumina tetrahedra. This zeolite structure is characterized by a repeating 3 dimensional network of large open aluminosilicate cages interconnected with smaller uniform openings or pores. Certain of these microselective adsorbents have been prepared synthetically from sodium silicate and sodium aluminate. After synthesis, these large cavities are filled with water which can be driven off by heating without collapsing the cage. When dehydrated, the cavities can re-adsorb large quantities of water and other vapors at low partial pressure. Due to the uniform strictures or pore openings connecting the aluminosilicate cavities, these zeolites exhibit the unique property of excluding large molecules from the cavity while allowing smaller molecules to pass through and be adsorbed thereby acting as microselective adsorbents for molecules according to their size and shape.

It has been shown that adsorbents having an effective pore size of about 4 to 7 angstrom units are of particular interest in adsorbing vapors of low molecular weight materials such as ethane, ethylene, and propylene, or mixtures of the same. Other adsorbents having much larger effective pore sizes are also of interest in adsorbing large molecules and storing them for later release. Presently, the available microselective zeolite adsorbents will adsorb molecules whose critical diameter is less than about 9 angstrom units. Z–21 zeolite can be used to effect separation of molecules whose critical diameter is up to about 17 angstroms. These materials can function as carriers for a wide variety of chemical compounds. When the chemical compound is needed, it is released by heating the carrier or displacement of the chemical with another adsorbate, such as water. In addition, these zeolites also exhibit the property of base exchange where one metal cation can be exchanged for another allowing controlled changes in effective pore size.

One of these well known zeolites is the product known as sodalite. This material, as well as its hydroxysodalite analog, have been well known for some time. The structural unit of the material is the sodalite cage. Another zeolite of more commercial significance is the type X zeolite with the faujasite (or diamond) structure. The structural units of this zeolite may also be thought of as sodalite cages although the arrangement of these cages is different from the mineral sodalite and indeed a more open, less dense structure is obtained.

The structural unit of our novel Z–21 zeolite may also be considered the sodalite cage. The coordination of the sodalite cages is tetrahedral in this zeolite as in the faujasite type of zeolites. The bridging of the sodalite cage is different in each case with the result that the scattering center is different and the resulting X-ray diffraction pattern is different in each case. Based on the structure derived from the X-ray diffraction pattern and the knowledge of the sodalite cage, the pore diameter of pure Z–21 zeolite is about 17 angstroms. Because of the large pore size of the pure product, special care must be taken in preparing these zeolites. There is some tendency toward aluminosilicate intergrowth with the result that in some cases the average pore diameter of the available open pore volume within the zeolite may be less than in the pure open form of the zeolite. Thus, our novel product may be characterized as a zeolite, having a large pore diameter. The pure Z–21 zeolite has a structural formula $Na_2O \cdot Al_2O_3 \cdot nSiO_2 \cdot XH_2O$, where $n$ may vary from 1.7 to 2.1 and X may vary from 0 to about 9.

As in the other zeolites, the sodium ion can be exchanged by treatment with solutions of ammonium salts such as the carbonates, sulfates, etc. In addition, the sodium cation can be exchanged with other metal cations.

The metal cation can be any metal of Groups I to VIII and the rare earth metals but preferably is a member of Groups II, III, IV, V, VI–B, VII–B, VIII, and the rare earths. Examples of suitable metal cations include calcium, magnesium, aluminum, antimony, barium, cadmium, rare earth metals such as cerium, praseodymium, lanthanum, neodymium, and samarium; chromium, cobalt, copper, iron, lead, lithium, manganese, nickel, silver, strontium, zinc, tin, platinum, palladium, molybdenum, vanadium, rhodium, and zirconium.

In these exchange reactions, there is evidence of increase in the available surface as determined by the well known Brunauer Emmett Teller surface area measurements using nitrogen adsorption.

Broadly speaking, our novel product can be prepared by reacting solutions of sodium aluminate and sodium silicate under alkaline conditions. The resulting silica-alumina-sodium hydroxide-water solution or slurry can have a wide range of reactant concentrations.

TABLE I

| | $SiO_2$ | $Al_2O_3$ | $Na_2O$ | $H_2O$ |
|---|---|---|---|---|
| a | 0.30 | 1.00 | 7.0 | 117 |
| b | 2.0 | 1.00 | 30 | 504 |
| c | 6.0 | 1.00 | 43 | 720 |

The silica to alumina mole ratio may vary from 0.2 to 1 to about 7 to 1 and the $Na_2O$ to $Al_2O_3$ mole ratio may vary from 7 to 1 to 43 to 1 as shown by examples below and tabulated in Table I. The reactant concentrations can vary further with changes in the temperature and reaction time.

The solutions are heated to temperatures of about 50 to 140° C., preferably about 70° C. to 110° C. for periods of ¼ to 8 hours, preferably about ½ to 2 hours. At the end of this time, the synthetic zeolite product is separated and recovered. As pointed out, it is necessary to control the reaction conditions to inhibit interstitial zeolite growth.

The X-ray diffraction pattern of the zeolite was determined using a Norelco X-ray diffractometer with copper $K_\alpha$ radiation. The instrument was operated at 40 kv. operating potential and 20 ma.

Settings for the electronic circuit panel were as follows:

Scale factor _____ 3
Scale multiplier _____ 1
Time constant _____ 2

At no time during the scan was the goniometer drive or chart drive stopped.

The strong lines of the X-ray diffraction pattern of our novel Z-21 zeolite are given in Table II.

TABLE II

A.

21.1±.2
13.0±.1
11.1±.1
9.2±.1
6.5±.1
6.2±.1
5.8±.1
4.3±.1
4.0±.1
3.8±.1
3.7±.1
3.1±.1
3.0±.1
2.8±.1

The invention is further illustrated by the following specific but non-limiting examples.

EXAMPLE I

An aluminate solution was prepared by dissolving 31.3 grams of alumina trihydrate (Alcoa C-31 alumina) and 330.2 grams of sodium hydroxide in 823 grams of water heated to 95° C. The solution was added with vigorous stirring to a silicate solution heated to about the same temperature. The silicate solution contained 86 grams of sodium silicate and 139.7 grams of NaOH in 823 grams of water. The resulting mixture was refluxed in a stainless steel container for one hour. After about 30 minutes, it was observed that a white crystalline precipitate was beginning to form. After one hour, the precipitated particles were large enough to be separated by ordinary filtration techniques. The crystals were separated and the precipitate washed several times with water to remove excess sodium hydroxide. The product was dried at 110° C. A total of 16.5 grams of product was recovered. The chemical analysis of the product is given in Table III.

TABLE III

Components (in weight percent):
  $Al_2O_3$ (dry basis) _____ 35.5
  $SiO_2$ (dry basis) _____ 41.2
  $Na_2O$ (dry basis) _____ 21.4
  Total volatiles (950° C.) _____ 11.8

Formula based on this analysis:

$$1.97SiO_2 \cdot 1Al_2O_3 \cdot 0.99Na_2O \cdot 1.89H_2O$$

The X-ray diffraction pattern of the product is set out in Table IV below:

TABLE IV

| $d$, A.: | Relative intensity |
|---|---|
| 21.12 | 50 |
| 12.98 | 75 |
| 11.07 | 70 |
| 9.18 | 35 |
| 8.42 | 10 |
| 7.50 | 3 |
| 7.06 | 10 |
| 6.51 | 100 |
| 6.23 | 50 |
| 5.82 | 20 |
| 5.60 | 10 |
| 5.30 | 5 |
| 5.15 | 15 |
| 4.79 | 15 |
| 4.50 | 10 |
| 4.34 | 20 |
| 4.24 | 3 |
| 4.12 | 15 |

TABLE IV.—Continued

| $d$, A.: | Relative intensity |
|---|---|
| 4.04 | 70 |
| 3.92 | 10 |
| 3.76 | 45 |
| 3.70 | 75 |
| 3.61 | 5 |
| 3.55 | 10 |
| 3.43 | 10 |
| 3.36 | 15 |
| 3.31 | 1 |
| 3.21 | 15 |
| 3.15 | 2 |
| 3.12 | 30 |
| 3.03 | 15 |
| 2.98 | 45 |
| 2.95 | ~0 |
| 2.90 | 2 |
| 2.88 | 5 |
| 2.82 | 15 |
| 2.77 | 10 |
| 2.75 | 45 |

EXAMPLE II

This example illustrates another preparation of the product that contains no detectable hydroxysodalite.

An aluminate solution was prepared by dissolving 82.3 grams of alumina trihydrate (Alcoa C-31 alumina) and 239.5 grams of sodium hydroxide in 835 grams of water, heated to 95° C. The solution was added with vigorous stirring to a silicate solution heated to about the same temperature. This silicate solution contained 54.4 grams of sodium silicate, 229.6 grams of sodium hydroxide and 822 grams of water. The resulting mixture was refluxed at 100° C. for 45 minutes. At the end of this time, the precipitate was separated by filtration, washed free of excess alkali and dried at 100° C. The resultant product had the following chemical analysis.

TABLE V

Components (in weight percent):
  $Al_2O_3$ _____ 31.4
  $SiO_2$ _____ 36.7
  $Na_2O$ _____ 19.0
  Total volatiles by difference _____ 12.2

Formula based on this analysis:

$$1.99SiO_2 \cdot Al_2O_3 \cdot 0.99Na_2O \cdot 2.20H_2O$$

An X-ray diffraction pattern of the product showed none of the lines for hydroxysodalite.

EXAMPLE III

An aluminate solution was prepared by dissolving 50 grams of alumina trihydrate (Alcoa C-31 alumina) and 120 grams of sodium hydroxide in 200 grams of water. The aluminate solution was heated to 95° C. A total of 22.2 grams of this solution was added to 120 grams of a 50% sodium hydroxide solution in 415.4 grams of water. This mixture was added with vigorous stirring to a silicate solution containing 90.2 grams of sodium silicate and 109.7 grams of a 50% sodium hydroxide solution in 368.8 grams of water. The silicate solution was also heated to a temperature of 95° C. The resulting mixture was refluxed at 100° C. for one hour. The heavy precipitate formed was removed by filtration, washed, reslurried, and washed thoroughly to remove excess alkali. The product was dried at 100° C. The chemical analysis of the product is shown in Table VI below:

TABLE VI

Components (in weight percent):
  $Al_2O_3$ _____ 34.2
  $SiO_2$ _____ 38.7
  $Na_2O$ _____ 19.2
  Total volatiles by difference _____ 7.9

Formula based on this analysis:

$$1.92SiO_2 \cdot Al_2O_3 \cdot 0.92Na_2O \cdot 1.3H_2O$$

What is claimed is:

1. A synthetic, crystalline zeolitic alumino-silicate having a composition expressed in terms of moles of oxides as follows:

$$\frac{M_2}{W}O : Al_2O_3 : nSiO_2 : XH_2O$$

wherein M represents an exchangeable cation selected from the group consisting of sodium, ammonium, calcium, magnesium, and rare earth ions and W represents the valence of M and $n$ may have any value from 1.7 to 2.1 and X may have a value from 0 to 9, said zeolite having an X-ray diffraction pattern essentially the same as that shown in Table IV, and a unit cell of $a_0 = 36.7 \pm 0.3$ A.

2. A synthetic crystalline zeolite having a composition expressed in terms of moles of oxides as follows:

$$\frac{M_2}{W}O : Al_2O_3 : nSiO_2 : XH_2O$$

wherein M represents an exchangeable cation selected from the group consisting of sodium, ammonium, calcium, magnesium, and rare earth ions and W represents the valence of M and $n$ may have any value from 1.7 to 2.1 and X may have any value from 0 to about 9 said zeolite having an X-ray powder diffraction pattern in which the more significant lines are essentially the same as that shown in Table II, and a unit cell of $a_0 = 36.7 \pm 0.3$ A.

References Cited
UNITED STATES PATENTS

| | | | |
|---|---|---|---|
| 2,882,243 | 4/1959 | Milton | 23—113 |
| 2,991,151 | 7/1961 | Breck et al. | 23—113 |
| 3,010,789 | 11/1961 | Milton | 23—113 |

OTHER REFERENCES

Barrer et al.: "J. Chem. Soc." 1959, pages 195–208.

EDWARD J. MEROS, Primary Examiner

U.S. Cl. X.R.

23—113